United States Patent [19]
Turner

[11] 3,972,237
[45] Aug. 3, 1976

[54] ELECTRONIC THERMOMETER

[75] Inventor: Robert Bruce Turner, Weymouth, Mass.

[73] Assignee: American Medical Electronics Corporation, Weymouth, Mass.

[22] Filed: May 28, 1974

[21] Appl. No.: 473,494

[52] U.S. Cl. ................. 73/362 AR; 73/362 SC; 73/432 CR
[51] Int. Cl.² .................................. G01K 7/24
[58] Field of Search ......... 73/362 AR, 359, 432 CR; 340/347 M, 382, 807, 645

[56] References Cited
UNITED STATES PATENTS

| | | | |
|---|---|---|---|
| 2,728,522 | 12/1955 | Ernst | 73/359 X |
| 3,217,144 | 11/1965 | Hinnah | 73/362 AR UX |
| 3,620,082 | 11/1971 | Peters | 73/362 AR |
| 3,702,076 | 11/1972 | Georgi | 73/362 AR |
| 3,713,136 | 1/1973 | Nagy | 340/347 M X |
| 3,768,310 | 10/1973 | Krepak | 73/362 AR |
| 3,791,217 | 2/1974 | Stout et al. | 73/362 SC X |
| 3,793,630 | 2/1974 | Meijer | 73/359 UX |
| 3,872,726 | 3/1975 | Kauffeld et al. | 73/362 AR |
| 3,872,728 | 3/1975 | Joyce et al. | 73/362 AR |
| 3,896,431 | 7/1975 | Dickinson | 340/347 M X |

Primary Examiner—Richard C. Queisser
Assistant Examiner—Frederick Shoon
Attorney, Agent, or Firm—Joseph S. Iandiorio

[57] ABSTRACT

An electronic thermometer system comprising a temperature sensing circuit for providing an analog signal representative of the temperature being sensed; a voltage to rate converter circuit responsive to the analog signal for providing uniform digital pulses at a repetition rate proportional to the temperature being sensed; and means for counting the digital pulses for a predetermined period of time for providing an indication of the temperature being sensed.

2 Claims, 6 Drawing Figures

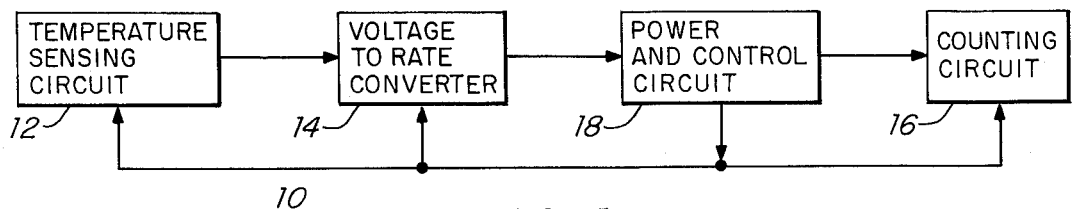
FIG. 1.
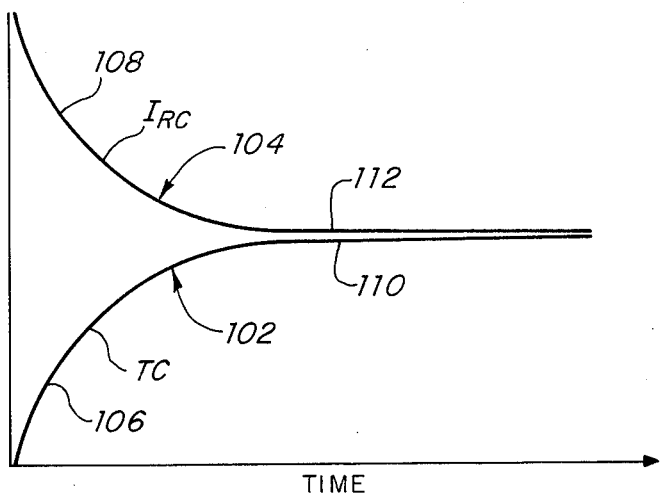
FIG. 4.
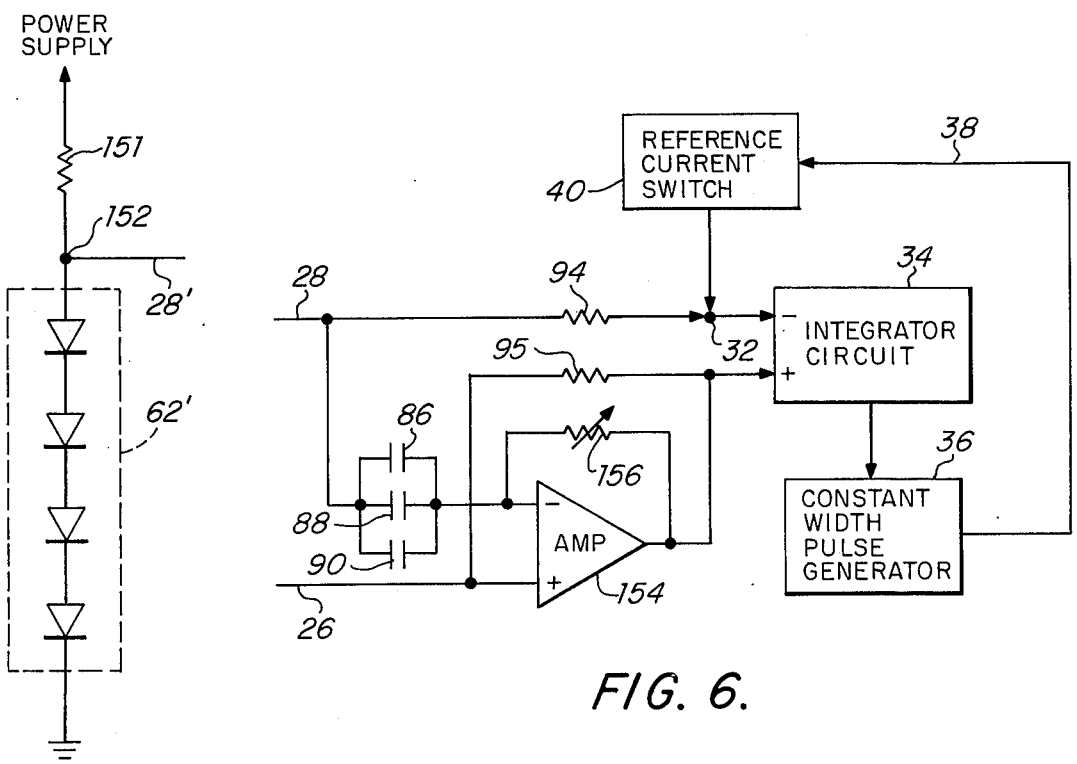
FIG. 5.
FIG. 6.

ELECTRONIC THERMOMETER

FIELD OF INVENTION

This invention relates to an electronic thermometer system utilizing a voltage to rate converter circuit for transforming an analog signal representative of a temperature being sensed into a digital signal proportional to that temperature for measurement by digital circuits to indicate the temperature, and to such a system having an anticipation circuit for introducing the final value of the temperature before it has been measured.

BACKGROUND OF INVENTION

Conventional electronic thermometer systems use a sensing element, e.g., thermocouple, thermistor, diode whose impedance changes, or voltage or current output varies as a function of the temperature to which it is exposed. The signal is submitted to an analog measuring or indicating device such as a galvanic meter which displays the temperature. Such systems are satisfactory in sophisticated technical and scientific environments where personnel are accustomed to such equipment. However, recently, electronic thermometers have become increasingly more widely used in less technically sophisticated areas such as patient care by medical personnel. Electronic thermometers quickly rivaled mercury thermometers in the area of cost and speed. The cost of using an electronic thermometer with disposable probe covers is compatible with the cost of purchase of, plus routine sterilization of mercury thermometers, and electronic thermometers can measure temperatures much more quickly conserving expensive and scarce personnel time. This area of application demands a more easily readable as well as smaller, lighter, more compact and less expensive electronic thermometer. In view of present electronic technology these aims are best served by making maximum use of digital as opposed to analog implementation. One attempt to create an electronic thermometer using at least some digital circuitry resulted in a system in which the temperature sensing probe provides a signal to a bridge circuit. When the temperature sensed exceeds some predetermined reference, the bridge imbalance causes a signal to step a counter and charge a capacitor. The counter causes a resistor to be inserted in the bridge to balance it. Further increase in temperature causes the cycle to be repeated until, the capacitor has been charged sufficiently to trigger a switch to display the temperature: when the changes in temperature are occurring at a slow enough rate relative to the thermal time constant of the thermometer it is assumed that the temperature sensed is at its final temperature within the desired accuracy. While such a system does operate in a digital fashion it requires many switches, extra resistors and circuitry in a large, heavy and expensive system. Increased accuracy to such a system is acquired at the cost of increased numbers of resistors and switches.

SUMMARY OF INVENTION

It is therefore an object of this invention to provide an improved, smaller, more compact, lighter and less expensive electronic thermometer system making increased use of digital electronics.

It is a further object of this invention to provide such an electronic thermometer system which converts the analog temperature signal into a digital signal whose pulse rate is proportional to the temperature.

It is a further object of this invention to provide such an electronic thermometer system which indicates final temperature before it is actually measured.

The invention features an electronic thermometer system having a temperature sensing circuit for providing an analog signal representative of the temperature being sensed. A voltage to rate converter circuit responsive to the analog signal provides uniform digital pulses at a repetition rate proportional to the temperature being sensed represented by that analog signal. Means are provided for counting the digital pulses for a predetermined period of time for providng an indication of the temperature being sensed.

DISCLOSURE OF PREFERRED EMBODIMENT

Other objects, features and embodiments will occur from the following description of a preferred embodiment and the accompanying drawings, in which:

FIG. 1 is a block diagram of an electronic thermometer system using a voltage to rate converter circuit according to this invention;

FIG. 4 is a graph illustrating the RC constant of the anticipation circuit and the thermal constant exhibited by the probe of FIGS. 2 and 3;

FIG. 5 is a schematic diagram illustrating an alternative construction for the probe of FIGS. 2 and 3; and FIG. 6 is a schematic diagram of an alternative construction of the anticipation circuit of FIG. 1.

Figure 2:
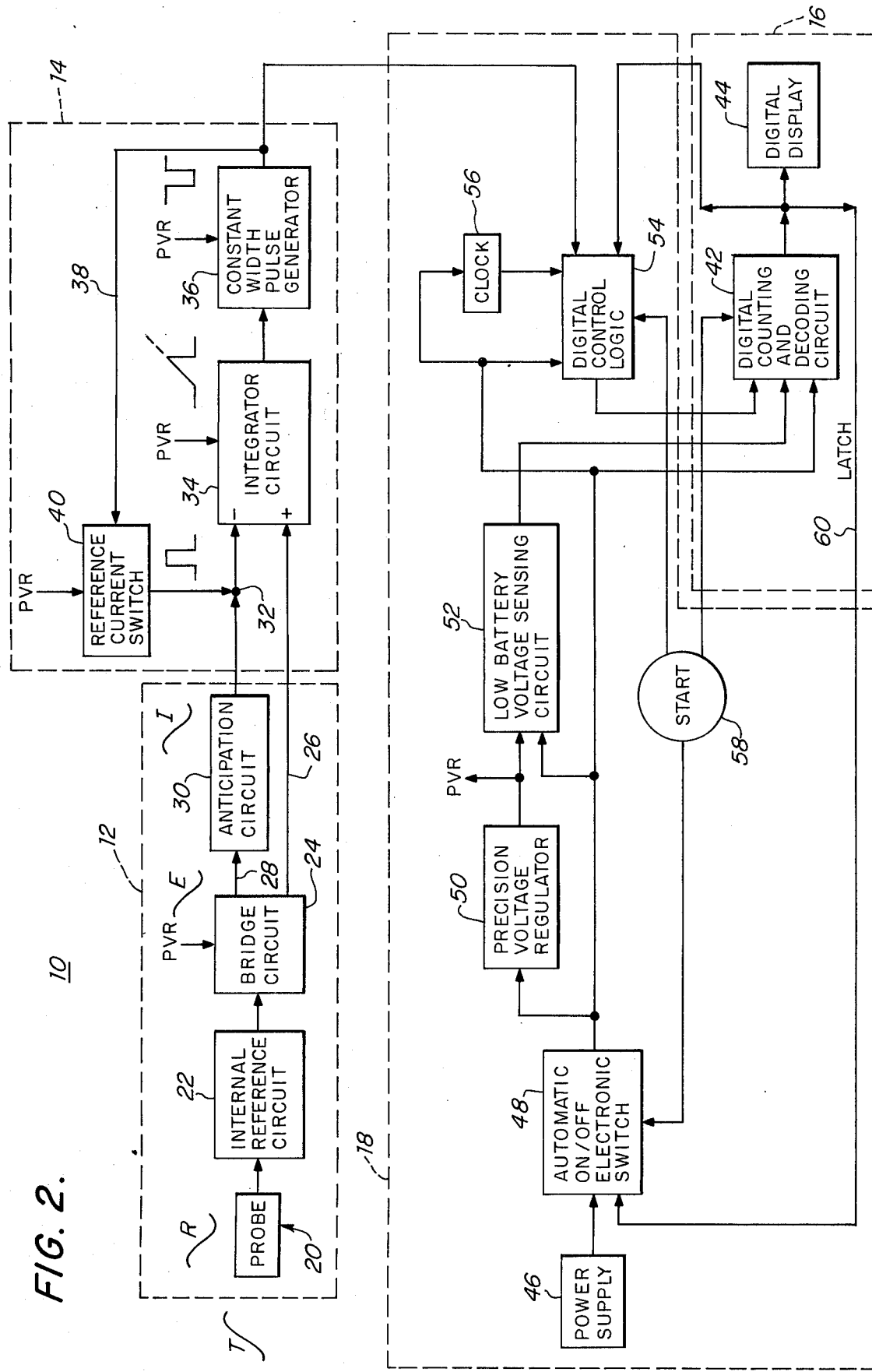
FIG. 2 is a more detailed block diagram illustrating one implementation of the system of FIG. 1.

There is shown in FIG. 1 an electronic thermometer system 10 according to this invention including a temperature sensing circuit 12 which senses the temperature and provides an analog signal representative thereof to the voltage to rate converter 14. Voltage to rate converter 14 provides at its output digital pulses whose repetition rate is proportional to the analog input signal representative of the temperature being sensed. These pulses are accumulated by counting circuit 16 to measure the temperature being sensed. This system is operated with power and control circuit 18.

Temperature sensing circuit 12 may include a probe 20, FIG. 2, for sensing a temperature to be measured and producing an analog signal representative thereof which is submitted through internal reference circuit 22 to bridge circuit 24. Internal reference circuit 22, immediately upon unplugging of probe 20 automatically connects a matching circuit to bridge circuit 24 in place of the input from probe 20, so that the accuracy and operation of the system can be verified. Bridge circuit 24 provides a reference output on line 26 and on line 28 provides a varying output as a function of the bridge imbalance representing the analog signal which is a function of the temperature sensed by probe 20. In this specific embodiment, used primarily to take the temperatures of humans, the measurement range is typically from 90° to 110°F. Thus reference output 26 of bridge circuit 24 represents the level of 90°F; when output 28 of bridge circuit 24 is equal to reference output 26 the thermometer probe 20 is measuring a temperature of 90°F. When output 28 is at a predetermined deviation from the level of output 26 the probe 20 is measuring 110°F. Output 28 is fed to anticipation circuit 30 which senses the rate of change of the temperature being sensed by probe 20 and modifies the signal on output 28 from bridge circuit 24, thereby providing a signal at summing point 32 in voltage to rate converter 14 representative of the final value of the temperature being sensed in advance of the actual sensing of that final value.

In voltage to rate converter 14 the signal at summing point 32 is directed to the negative input of integrator circuit 34 whose positive input receives reference output 26 from bridge circuit 24. A difference between summing point 32 and reference output 26 at the input to integrator 34 cause it to provide a positive slope ramp at its output to constant width pulse generator 36, which provides a negative going output pulse of fixed width when the ramp reaches a predetermined voltage level. The fixed width pulse is delivered along feedback line 38 to reference current switch 40 which produces a positive going pulse having fixed width and fixed amplitude and delivers it to summing point 32. The presence of this pulse temporarily restores summing point 32 to the level of output 26 causing the integrator circuit output to drop resulting in a sawtooth output signal. Constant width pulse generator 36 then produces no further pulses to reference current switch 40. Therefore no further pulses are delivered to summing point 32 and the level at summing point 32 once again moves away from that at the reference output 26. This causes integrator circuit 34 to provide another positive ramp and the cycle to begin again. Since the pulse fed back to summing point 32 has fixed width and fixed amplitude it is the rate of those pulses which must adjust to the relative imbalance between summing point 32 and reference output 26. Thus the greater the difference between these two inputs to integrator circuit 34, the higher will be the repetition rate of the pulses provided at the output of constant width pulse generator 36; this repetition rate is proportional to the temperature being sensed by probe 20. The illustrated configuration of voltage to rate converter 14 in FIG. 2 which includes summing point 32, integrator circuit 34, constant width pulse generator 36, feedback line 38 and reference current switch 40 is one example of a voltage to rate converter which may be used. A voltage controlled oscillator or other means for producing an output whose frequency varies in proportion to an analog signal may be used.

Counting circuit 16 includes digital counting and decoding circuit 42 which counts the digital pulses provided at the output of constant width pulse generator 46 for a predetermined period of time and decodes that count to display the measured temperature on digital display 44.

Power and control circuit 18 includes a power supply 46 and an automatic on-off electronic switch 48 which controls all power to the system. Precision voltage regulator 50 provides regulated voltage, PVR, to bridge circuit 24, reference current switch 40, integrator circuit 34, constant width pulse generator 36, and low battery voltage sensing circuit 52. The other input to low battery voltage sensing circuit 52 is the unregulated power supplied at the output of automatic on-off electronic switch 48. When the unregulated power supply voltage decreases to a predetermined level relative to the regulated voltage output provided by precision voltage regulator 50, low battery voltage sensing circuit 52 provides a signal to digital counting and decoding circuit 42 causing it to extinguish the least significant digit of the temperature appearing in digital display 44.

Electronic thermometer system 10 operates in two modes a time display mode and a temperature display mode. Digital control logic 54 supervises system performance in each of these modes and controls the transition between them. In the time display mode digital control logic 54 passes pulses from clock 56 to digital counting and decoding circuit 42; while in the temperature display mode digital control logic 54 directs pulses from constant width pulse generator 36 to digital counting and decoding circuit 42. The system is operated by actuation of start switch 58.

In operation, when start switch 58 is actuated, automatic on-off electronic switch 58 is turned on to supply power from power supply 46 to the rest of the system, and digital control logic 54 and digital counting and decoding circuit 42 are reset. Probe 20 in contact with the patient whose temperature is to be measured begins to sense the temperature. As temperature T, FIG. 2, sensed by probe 20 increases the resistance R of the thermistor used in probe 20 decreases; the voltage E at output 28 of bridge circuit 24 decreases, increasing the negative current I at summing point 32. The difference in levels of output 26 and summing point 32 causes pulses to be generated at the output of constant width pulse generator 36 at a repetition rate required to restore summing point 32 to the proper level. The repetition rate of the pulses at the output of constant width pulse generator 36 stabilizes in a short period of time to represent the final value of the temperature being sensed. This period may be reduced still further by the use of anticipation circuit 30 as explained previously.

Simultaneously with this action, upon the actuation of start switch 58, a latch signal on line 60 from digital counting and decoding circuit 42 enables automatic on-off electronic switch to stay on for a predetermined period of time after the start switch has been pressed and released. In this particular embodiment the period of time is equal to the duration of the time display mode plus the duration of the temperature display mode which is system 10 are 20 seconds and 10 seconds, respectively. The signal on latch line 60 is controlled during the 20 second duration of the time display mode by clock operated logic and for the additional ten second duration of the temperature display mode by an RC timing network. Simultaneously with the actuation of start switch 58 digital control logic 54 passes clock pulses from clock 56 to digital counting and decoding circuit 42. These clock pulses may have a duration of 100 milliseconds so that a count of 10 such clock pulses by digital counting and decoding circuit 42 indicates 1 second. At the end of each second so accumulated digital display 44 is enabled to display the number 1 through 19 representing the time. At the end of the twentieth second digital control logic 54 transfers the system into the temperature display mode by permitting passage for the period of one clock pulse, of the pulses at the output of constant width pulse generator 36 to digital counting and decoding circuit 42 which accumulates and decodes the count and causes the temperature to be displayed in digital display 44.

Figure 3:
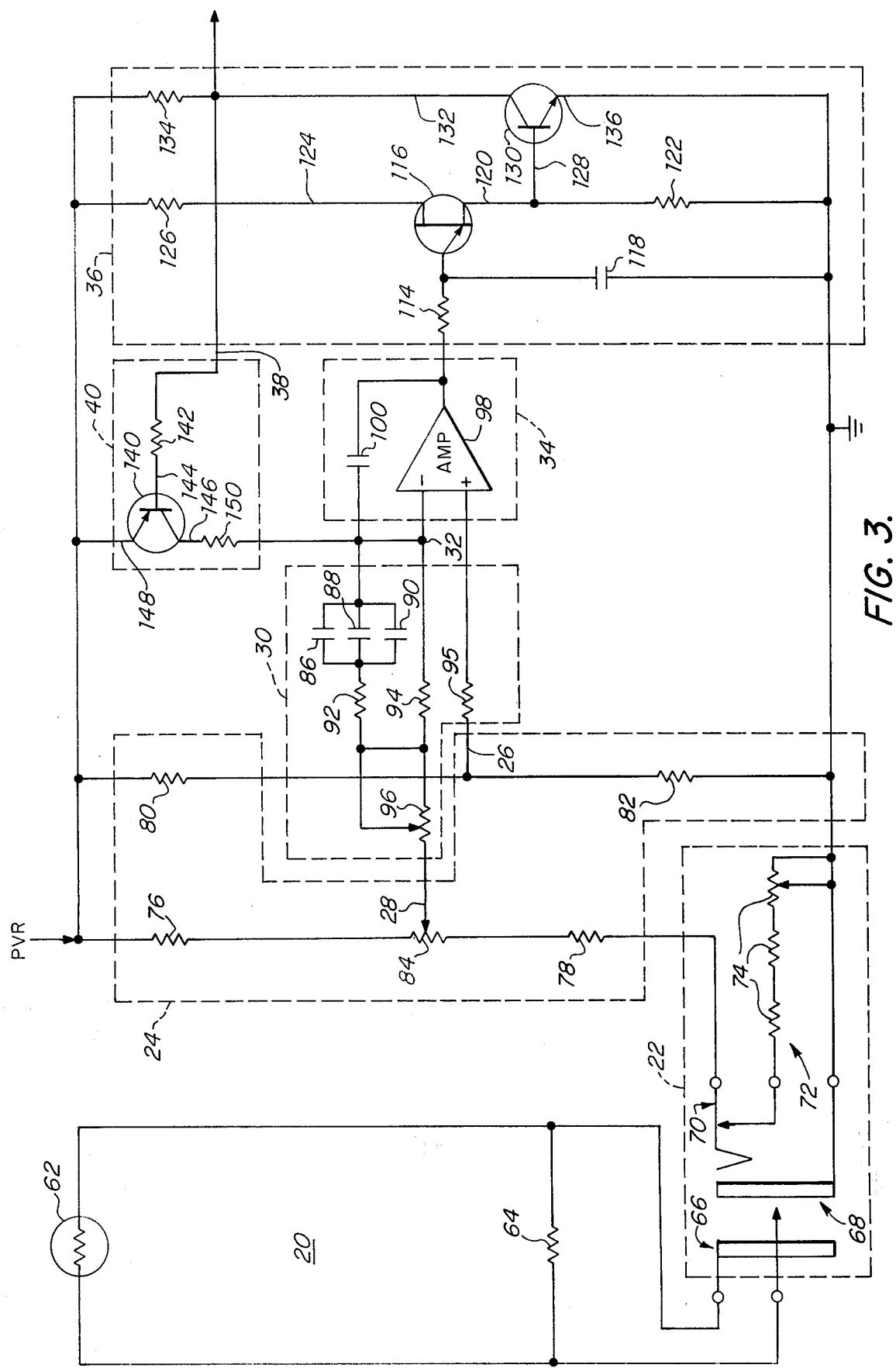
FIG. 3 is a schematic diagram of the probe, internal temperature reference circuit, bridge circuit, anticipation circuit, reference current switch, integrator circuit and constant width pulse generator of FIG. 2.

One implementation of temperature sensing circuit 12 and voltage to rate converter 14 is illustrated in FIG. 3. Probe 20 includes thermistor 62 connected in parallel with normalizing resistor 64. Normalizing resistor 64 is chosen to standardize the impedance of probe 20 at some reference level. For example in this application where the temperature measuring range is 90° to 110°F resistor 64 is chosen to standardize probe 20 in the center of the range at 100°F to facilitate interchangeability of probes.

The output of probe 20 terminates in plug 66 illustrated in FIG. 3 as part of internal reference circuit 22. Plug 66 engages with socket 68 which includes switch 70. Internal reference circuit 22 also includes a matching circuit 72 including one or more resistor 74, at least one of which is adjustable. Matching circuit 72 and probe 20 are selectively connected to bridge circuit 22 by switch 70. Bridge circuit 22 includes four arms, resistors 76, 78, 80 and 82, respectively. Resistor 84 is an adjustable resistor used to balance the bridge. When plug 66 is engaged with socket 68 probe 20 is connected in the bridge arm with resistor 78 and matching circuit 72 is disconnected therefrom. Conversely when plug 66 is unplugged from socket 68, probe 20 is disconnected from the arm of the bridge including resistor 78 and matching circuit 72 is included in place of it.

Anticipation circuit 30 includes one or more capacitors 86, 88 and 90 which provide an RC constant which closely matches the thermal time constant of probe 20. Resistor 92 may also be used to adjust the RC time constant.

Adjustable resistor 96, shown for convenience as a part of anticipation circuit 30, is used in conjunction with resistor 94 to limit the current flowing from bridge circuit 24 to summing point 32 and thereby control the pulse repetition rate of the output of constant width pulse generator 36 for a given bridge imbalance. For example, resistor 96 is typically adjusted so that a temperature of 90°F produces a zero pulse rate, a temperature of 100°F causes a pulse rate of 1,000 pulses per second and a temperature of 110°F produces a pulse repetition rate of 2,000 pulses per second. Resistor 95 is provided at reference output 26.

The manner in which anticipation circuit 30 operates to provide an advance indication of the final value of the temperature being measured before that final value is actually measured may be better understood with reference to FIG. 4 which illustrates thermal time constant 102 of probe 20 and the current characteristic 104 through the RC network of anticipation network 30; curves 102 and 104 closely resemble a mirror image of each other: each has an initial steep portion 106, 108 and a terminal flat portion 110, 112. At the beginning of the temperature measuring cycle when the thermal time constant 102 indicates that the temperature of the probe 20 is increasing at a very high rate the current at output 28 of bridge circuit 24, the current passed by capacitors 86, 88 and 90 is also high. The capacitors thus conduct heavily introducing additional current to summing point 32 causing summing point 32 to experience a current flow representative of a temperature value which has not yet been sensed. As the rate of temperature increase slows so too does the rate of current increase and thus the current through the capacitors so that the final condition is correctly portayed by summing point 32 well in advance of the time when the final value of temperature is actually sensed by probe 20.

Integrator circuit 34, FIG. 3, includes operational amplifier 98 with a feedback loop including capacitor 100. Constant width pulse generator 36 includes limiting resistor 114 connected to the emitter of the unijunction transistor 116 whose emitter is connected to ground through capacitor 118. Base 120 of transistor 116 is connected to ground through resistor 122 and base 124 is connected to the regulated power supply through resistor 126. Transistor 116 is biased to be in the off condition until the output of integrator 34 reaches a predetermined threshold level at which capacitor 118 has charged suffficiently so that the emitter of transistor 116 has reached the intrinsic ratio value of approximately 50% of the voltage across bases 120 and 124. Transistor 116 then conducts providing a discharge path from the emitter through base 120 and resistor 122. The RC circuit consisting of capacitor 118 and resistor 122 fixes the width of the pulses generated by the circuit. When capacitor 118 is sufficiently discharged so that the emitter of transistor 116 is below the intrinsic value transistor 116 turns off. The output from base 120 is fed to base 128 of transistor 130 whose collector 132 is connected to the regulated power supply through resistor 134. Emitter 136 is tied directly to ground. Transistor 132 inverts and amplifies the output of transistor 116 to feed back a negative going pulse of fixed width to reference current switch 40.

Reference current switch 40 includes transistor 140 which receives the feedback from constant width pulse generator 36 over feedback line 38 through resistor 132 connected to its base 144. When in response to a negative going pulse on feedback line 38 base 144 goes low, transistor 140 conducts causing its collector 146 to rise toward the supply voltage to which its emitter 148 is connected, thereby increasing the current flow through the resistor 150 to summing point 32.

Voltage to rate converter 14 is not restricted to use with any particular configuration of temperature sensing circuit 12. For example, one or more temperature sensitive diodes 62', FIG. 5, may be used as the temperature sensing element in place of thermistor 62. The junction voltages of diodes 62' vary in response to changes in temperature to which they are exposed. Thus the quiescent voltage e.g., 2 volts at junction 152 of resistor 151 and diodes 62' varies as a function of the temperature sensed and that voltage variation may be delivered on line 28' to voltage to rate converter 14, either directly or through anticipation circuit 30, completely eliminating the need for bridge circuit 24.

Anticipation circuit 30 may advantageously be configured differently. For example, since positive pulses from reference current switch 40 are fed directly to summing point 32 in which anticipation circuit capacitors 86, 88 and 90 are connected, these capacitors tend to alter the magnitude and shape of these positive pulses thereby lowering the loop gain through integrator circuit 34, constant width pulse generator 36, and reference current switch 40. This problem may be overcome by using the approach shown in FIG. 6 where the anticipation circuit is no longer connected to summing point 32 at the negative input to integrator circuit 34 but rather is connected to the reference output 26 at the positive input of integrator circuit 34. Capacitors 86, 88 and 90 are connected to the negative input terminal of amplifier 154. The other ends of these capacitors are connected to variable output 28 as before which also, as before, is connected through resistor 94 to summing point 32, and the negative input of integrator circuit 34.

The positive input of amplifier 154 is connected to reference output 26 which is also connected as before through resistor 95 to the positive input of integrator circuit 34; an adjustable feedback resistor 156 is connected between the input and output of amplifier 154.

Thus the configuration shown in FIG. 6 removes the connection of the anticipation circuit from the summing point 32, so that the pulses from reference current switch 40 are no longer affected by capacitors 86, 88 and 90. The configuration of FIG. 6 also illustrates that the anticipation function can be accomplished by adjusting the reference output 26 instead of varying output 28.

Other embodiments will occur to those skilled in the art and are within the following claims.

What is claimed is:

1. An electronic thermometer system comprising:
a temperature sensing circuit for providing an analog signal representative of the temperature being sensed;
a voltage to rate converter circuit responsive to said analog signal for providing constant width and amplitude pulses at a repetition rate which is proportional to the temperature being sensed, including an integrating circuit, having a first input for receiving said analog signal and a second input for receiving a reference input, responsive to a difference between said first and second inputs for providing a voltage proportional to that difference; a pulse generating circuit for producing pulses of constant width and amplitude, each said pulse provided in response to a predetermined output level of said integrator; and a feedback circuit for introducing each said pulse to one of said first and second inputs to reduce the difference between said first and second inputs and reset said integrating circuit; and
means for counting said pulses for a predetermined period of time for providing an indication of the temperature being sensed.

2. An electronic thermometer system comprising:
a temperature sensing circuit for providing an analog signal representative of the temperature being sensed;
a voltage to rate converter circuit responsive to said analog signal for providing constant width and amplitude pulses at a repetition rate which is proportional to the temperature being sensed, including an integrating circuit, having a first input for receiving said analog signal and a second input for receiving a reference input, responsive to a difference between said first and second inputs for providing a voltage proportional to that difference; a pulse generating circuit for producing pulses of constant width and amplitude, each said pulse produced in response to a predetermined output level of said integrator; and a feedback circuit for introducing each said pulse to one of said first and second inputs to reduce the difference between said first and second inputs and reset said integrating circuit; including an RC network which includes capacitive and resistive impedance components interconnecting said temperature sensing circuit and said voltage to rate converter circuit, which has a current characteristic inverse, and similar to, the thermal time constant of said temperature sensing circuit, and which is responsive to said analog signal representative of the temperature being sensed to increase the current flow to said voltage to rate converter circuit for driving the system to indicate the final value temperature before that temperature is actually measured.

* * * * *